US009871741B2

(12) United States Patent
Kurtzman et al.

(10) Patent No.: US 9,871,741 B2
(45) Date of Patent: Jan. 16, 2018

(54) RESOURCE MANAGEMENT BASED ON DEVICE-SPECIFIC OR USER-SPECIFIC RESOURCE USAGE PROFILES

(71) Applicant: Microsoft Corporation, Redmond, WA (US)

(72) Inventors: Timothy M. Kurtzman, Redmond, WA (US); David A. Whitechapel, Seattle, WA (US); Abolade Gbadegesin, Redmond, WA (US); Adina M. Trufinescu, Redmond, WA (US); Jeremy P. Robinson, Seattle, WA (US); Samarth H. Shah, Seattle, WA (US); Akhilesh Kaza, Sammamish, WA (US); Andrew Clinick, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 462 days.

(21) Appl. No.: 14/264,838

(22) Filed: Apr. 29, 2014

(65) Prior Publication Data

US 2015/0256476 A1    Sep. 10, 2015

Related U.S. Application Data

(60) Provisional application No. 61/950,620, filed on Mar. 10, 2014.

(51) Int. Cl.
*G06F 15/173* (2006.01)
*H04L 12/911* (2013.01)
(Continued)

(52) U.S. Cl.
CPC ............ *H04L 47/70* (2013.01); *G06F 9/5011* (2013.01); *G06F 9/5016* (2013.01);
(Continued)

(58) Field of Classification Search
CPC ..... H04L 47/70; G06F 9/5016; G06F 9/5022; G06F 9/5011; G06F 17/3053; G06F 2209/5019
(Continued)

(56) References Cited

U.S. PATENT DOCUMENTS 8,112,755 B2    2/2012  Apacible et al.
8,132,175 B2    3/2012  Yoo
(Continued)

FOREIGN PATENT DOCUMENTS

CN    103024825 A    4/2013
EP    2538327 A1    12/2012
(Continued)

OTHER PUBLICATIONS

International Search Report and Written Opinion Issued in PCT Patent Application No. PCT/US2015/017892, dated Jun. 9, 2015, 12 Pages.
(Continued)

*Primary Examiner* — Aftab N. Khan
(74) *Attorney, Agent, or Firm* — Fiala & Weaver P.L.L.C.

(57) ABSTRACT

Resources used by a foreground process associated with an application as well as one or more background tasks associated with the application that are running as separate processes on the computing device are tracked. Historical data relating to resource usage by the application is utilized to predict a resource usage amount for the application which is then stored. A subsequent launch of the application can be conditioned upon whether the predicted resource usage amount is available. If the predicted resource usage amount is available, it can be allocated to the application and the application can be launched. If the application then exceeds the predicted resource usage amount, other processes executing concurrently therewith may be terminated to free
(Continued)

up the resource. Regardless of how the application performs, new resource usage data is obtained for the application, which is then used to adjust the predicted resource usage amount.

19 Claims, 12 Drawing Sheets

(51) Int. Cl.
    *G06F 17/30*     (2006.01)
    *G06F 9/50*     (2006.01)

(52) U.S. Cl.
    CPC ........ *G06F 9/5022* (2013.01); *G06F 17/3053* (2013.01); *G06F 2209/5019* (2013.01)

(58) Field of Classification Search
    USPC ......................................................... 709/223
    See application file for complete search history.

(56) References Cited

U.S. PATENT DOCUMENTS

| | | | |
|---|---|---|---|
| 8,578,394 B2 | 11/2013 | Srour et al. | |
| 9,118,520 B1* | 8/2015 | Mao | H04L 29/06 |
| 9,317,338 B2* | 4/2016 | Wong | G06F 9/50 |
| 2004/0117380 A1* | 6/2004 | Perrow | G06F 3/0237 |
| | | | 714/E11.207 |
| 2007/0169125 A1 | 7/2007 | Qin | |
| 2007/0220371 A1* | 9/2007 | Duyanovich | G06F 11/3447 |
| | | | 714/49 |
| 2007/0294691 A1 | 12/2007 | Park | |
| 2008/0005736 A1* | 1/2008 | Apacible | G06F 9/4843 |
| | | | 718/100 |
| 2010/0042801 A1 | 2/2010 | Lee et al. | |
| 2010/0131959 A1* | 5/2010 | Spiers | G06F 9/50 |
| | | | 718/105 |
| 2012/0102504 A1 | 4/2012 | Iyer et al. | |
| 2012/0110582 A1* | 5/2012 | Ferdous | G06F 11/3442 |
| | | | 718/104 |
| 2012/0144017 A1* | 6/2012 | Singh | G06F 1/3206 |
| | | | 709/224 |
| 2012/0174106 A1 | 7/2012 | Seo et al. | |
| 2013/0097601 A1* | 4/2013 | Podvratnik | G06F 9/5027 |
| | | | 718/1 |
| 2013/0227585 A1* | 8/2013 | Ichikawa | G06F 9/50 |
| | | | 718/104 |
| 2015/0244645 A1* | 8/2015 | Lindo | H04L 47/823 |
| | | | 709/224 |

FOREIGN PATENT DOCUMENTS

| | | |
|---|---|---|
| WO | 2007071286 A1 | 6/2007 |
| WO | 2012031799 A1 | 3/2012 |

OTHER PUBLICATIONS

Devarakonda, et al., "Predictability of Process Resource Usage: A Measurement-Based Study on Unix", in Proceedings of the IEEE Transactions on Software Engineering, vol. 15, Issue 12, Dec. 1, 1989, 8 Pages.

Hackborn, Dianne, "Process Stats: Understanding How Your App Uses RAM", Published on: Jan. 31, 2014, Available at: <http://android-developers.blogspot.nl/2014/01/process-stats-understanding-how-your.html>, 6 pages.

"HTG Explains: How Android Manages Processes", Published on: Apr. 23, 2013, Available at: <http://www.howtogeek.com/161225/htg-explains-how-android-manages-processes/>, 3 pages.

"Second Written Opinion Issued in PCT Application No. PCT/US2015/017892", dated Jan. 26, 2016, 9 Pages.

"International Preliminary Report on Patentability Issued in PCT Application No. PCT/US2015/017892", dated Jun. 21, 2016, 10 Pages.

* cited by examiner

RESOURCE MANAGEMENT BASED ON DEVICE-SPECIFIC OR USER-SPECIFIC RESOURCE USAGE PROFILES

CROSS-REFERENCE TO RELATED APPLICATIONS

This application claims priority to U.S. Provisional Patent Application No. 61/950,620, filed Mar. 10, 2014, the entirety of which is incorporated by reference herein.

BACKGROUND

Today's mobile devices, especially today's low-end mobile devices, are severely challenged by multi-tasking scenarios. It is often the case that, in order to be competitive at scale, mobile devices must be manufactured using low-end and/or low-powered parts. This is true in particular for the memory used to implement mobile devices, which includes random access memory (RAM), MultiMediaCards (MMCs) and Secure Digital (SD) cards. The net effect of this is that conventional mobile devices that rely on paging for memory management fall over very quickly when trying to concurrently run multiple processes. This leads to a very poor user experience and handicapped multi-tasking scenarios. This problem is becoming especially relevant as the applications and operating systems being developed for mobile devices become larger and larger while the marketplace demands reduced manufacturing costs.

Previously, the issue of having insufficient memory to support the concurrent execution of multiple processes on a mobile device was handled in one or more of the following ways: the use of paging for memory management; providing more memory on the mobile device; and placing limits on the size of applications and operating systems. As noted above, paging can lead to a very poor user experience and handicapped multi-tasking scenarios. Providing more memory drives up mobile device cost, complexity and power consumption. Placing size limits on applications and operating systems makes developing and delivering desired functionality to users extremely difficult. For at least these reasons, existing memory management solutions for mobile devices are deficient. Better memory management techniques are needed to enable today's mobile devices to concurrently execute multiple processes in a manner that does not adversely impact user experience and that enables a wide variety of multi-tasking scenarios.

SUMMARY

Systems, methods, apparatuses, and computer program products are described herein that enable the tracking of the usage of various resources, such as volatile and non-volatile memory, central processing unit (CPU), input/output (I/O), network, power, and sensors, by applications executing on a computing device, such as a mobile computing device. The techniques described herein advantageously track resource usage for an application by tracking both the resources used by a foreground process associated with the application (e.g., a process that is currently providing a user interface for the application and occupying at least a portion of a display associated with the computing device) as well as one or more background tasks associated with the application that are running as separate processes on the computing device. Historical data relating to resource usage by the application is utilized to predict a resource usage amount for the application which is then stored. A subsequent launch of the application can be conditioned upon whether the predicted resource usage amount is available. If the predicted resource usage amount is not available, the application may be prevented from launching. If the predicted resource usage amount is available, it can be allocated to the application and the application can be launched. If the application then exceeds the predicted resource usage amount, other processes executing concurrently therewith may be terminated to free up the resource. Regardless of how the application performs, new resource usage data is obtained for the application, which is then used to adjust the predicted resource usage amount. In this manner, the allocation of resources for the application can be automatically fine-tuned for a user over time based on his/her usage patterns and the computing device is enabled to provide a better user experience and improved performance particularly during multi-tasking scenarios. For a computing device that supports multiple users, predicted resource usage amounts may be stored for each user/application combination. Such an approach to resource management advantageously enables a computing device to learn and tune its experiences to its user(s) over time.

The systems, methods, apparatuses and computer program products described herein are also capable of tracking other information related to resource usage by an application and/or user, such as times, locations, and events associated with particular resource usage behaviors. Such information can advantageously be used to predictively allocate resources of the computing device to an application even before a user has attempted to launch it. Furthermore, applications and/or application data may be loaded into memory at a point in time before the user is expected to access them. In accordance with certain embodiments, resources may be predictively allocated and applications and/or application data may be loaded into memory for a particular user based on general usage patterns determined by collecting data from a wide variety of users and computing devices. Then, such allocations and loading may be fine-tuned based on the behaviors of the particular user.

In particular, a method implemented by a computing device for managing a resource thereof is described herein. The resource may comprise, for example, at least one of a volatile or non-volatile memory resource, a CPU resource, an I/O resource, a network resource, a power resource, and a sensor resource. In accordance with the method, a first amount of the resource that is used by a first instance of an application while being executed by the computing device is determined. Determining the first amount may include determining an amount of the resource that is used by a foreground process associated with the first application and one or more background tasks associated with the first instance of the application. A first predicted resource usage amount for the application is calculated based at least on the first amount. The first predicted resource usage amount is stored in a data store. Then, a second amount of the resource to be allocated to a second instance of the application to be executed by the computing device is determined based at least on the first predicted resource usage amount stored in the data store.

In one embodiment of the foregoing method, calculating the first predicted resource usage amount for the application based on at least the first amount includes obtaining a maximum resource usage amount for the application by comparing the first amount to one or more previously-determined amounts associated with one or more previously-executed instances of the application, and calculating the first predicted resource usage amount based on the maximum resource usage amount.

In an alternative embodiment, calculating the first predicted resource usage amount for the application based on at least the first amount includes obtaining an average resource usage amount for the application based on the first amount and one or more previously-determined amounts associated with previously-executed instances of the application, and calculating the first predicted resource usage amount based on the average resource usage amount. In further accordance with this embodiment, obtaining the average resource usage amount for the application may include multiplying the first amount by a first weighting factor to obtain a first product, multiplying a running average amount obtained based on at least the one or more previously-determined amounts by a second weighting factor to obtain a second product, and summing the first product and the second product. The first weighting factor may be larger than, smaller than, or equal to the second weighting factor depending upon the implementation.

The foregoing method may also include determining that the second amount of the resource is not currently available and, in response thereto, performing certain actions such as preventing execution of the second instance of the application, and/or terminating one or more processes that are currently executing on the computing device.

The foregoing method may further include determining that an amount of the resource used by the second instance of the application while being executed by the computing device exceeds the second amount, and in response thereto, terminating one or more processes that are concurrently executing on the computing device.

In another embodiment of the foregoing method, the determining, calculating and storing steps include determining the first amount of the resource that is used by the first instance of the application while being executed by the computing device on behalf of a first user, calculating the first predicted resource usage amount for the application and the first user based at least on the first amount, storing the first predicted resource usage amount in the data store, and determining the second amount of the resource to be allocated to the second instance of the application to be executed by the computing device on behalf of the first user based at least on the first predicted resource usage amount stored in the data store. In accordance with this embodiment, the method further includes determining a third amount of the resource that is used by a third instance of the application while being executed by the computing device on behalf of a second user, calculating a second predicted resource usage amount for the application and the second user based at least on the third amount, storing the second predicted resource usage amount in the data store, and determining a fourth amount of the resource to be allocated to a fourth instance of the application to be executed by the computing device on behalf of the second user based at least on the second predicted resource usage amount stored in the data store.

A computer program product is also described herein. The computer program product includes a computer-readable memory having computer program logic recorded thereon that when executed by at least one processor of a computing device causes the at least one processor to perform operations. The operations include receiving a request to launch an application, obtaining a predicted resource usage amount for the application, the predicted resource usage amount being based on a monitored usage of a resource of the computing device during one or more prior executions of the application by the computing device, determining whether a sufficient amount of a resource is available by comparing the predicted resource usage amount to an amount of the resource that is currently available, and allowing the application to launch in response to at least determining that a sufficient amount of the resource is available. The resource may comprise one of a volatile or non-volatile memory resource, a CPU resource, an I/O resource, a network resource, a power resource, and a sensor resource. The monitored usage of the resource for the application may entail monitored usage of the resource by a foreground process associated with the application and one or more background tasks associated with the application.

In one embodiment of the foregoing computer program product, the operations further include not allowing the application to launch in response to at least determining that a sufficient amount of the resource is not available.

In another embodiment, the operations further include causing one or more processes to be terminated in response to at least determining that a sufficient amount of the resource is not available.

In yet another embodiment, the operations further include, in response to determining that an amount of the resource used by the application after being launched exceeds the predicted resource usage amount, terminating one or more processes that are concurrently executing on the computing device.

In still another embodiment, the receiving step includes receiving the request to launch the application on behalf of a first user and the obtaining step includes obtaining a predicted resource usage amount for the application and the first user.

A system implemented on a computing device is also described herein. The system includes at least one processor and memory that is accessible by the at least one processor. The memory stores components for execution by the at least one processor. The components include a resource manager operable to monitor a pattern of usage of at least one resource of the computing device by one or more of an application and a user, to store information associated with the pattern of usage, and to use the stored information to predictively allocate at least a portion of the resource to at least one process prior to execution thereof by the at least one processor. The at least one resource may include a volatile or non-volatile memory resource, a CPU resource, an I/O resource, a network resource, a power resource, and a sensor resource.

In one embodiment of the foregoing system, the resource manager is operable to predictively allocate the at least a portion of the resource to an application prior to a user of the computing device or any other entity launching the application. In another embodiment of the foregoing system in which the at least one resource comprises memory, the resource manager is further operable to load at least a portion of an application or data associated with an application into the predictively-allocated memory prior to a user of the computing device or any other entity launching the application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
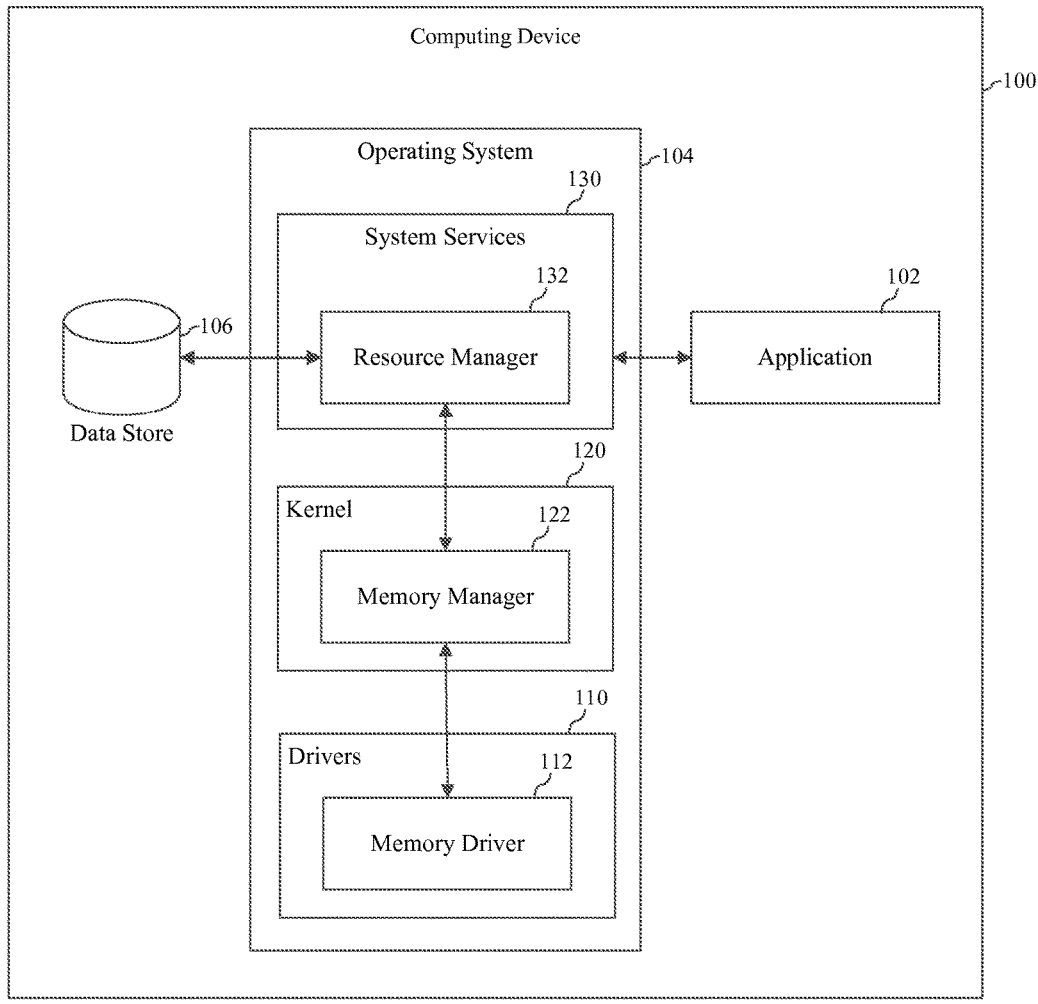
FIG. 1 is a block diagram of a computing device that performs resource management based on device-specific or user-specific resource usage profiles in accordance with an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

Systems, methods, apparatuses, and computer program products are described herein that enable the tracking of the usage of various resources, such as volatile and non-volatile memory, CPU, I/O, network, power, and sensors, by applications executing on a computing device, such as a mobile computing device. The techniques described herein advantageously track resource usage for an application by tracking both the resources used by a foreground process associated with the application (e.g., a process that provides the user interface to the application and may exclusively occupy a display associated with the computing device) as well as one or more background tasks associated with the application that are running as separate processes on the computing device. Historical data relating to resource usage by the application is utilized to predict a resource usage amount for the application which is then stored. A subsequent launch of the application can be conditioned upon whether the predicted resource usage amount is available. If the predicted resource usage amount is available, it can be allocated to the application and the application can be launched. If the application then exceeds the predicted resource usage amount, other processes executing concurrently therewith may be terminated to free up the resource. Regardless of how the application performs, new resource usage data is obtained for the application, which is then used to adjust the predicted resource usage amount. In this manner, the allocation of resources for the application can be automatically fine-tuned for a user over time based on his/her usage patterns and the computing device is enabled to provide a better user experience and improved performance particularly during multi-tasking scenarios. For a computing device that supports multiple users, predicted resource usage amounts may be stored for each user/application combination.

The systems, methods, apparatuses and computer program products described herein are also capable of tracking other information related to resource usage by the application and/or user, such as times, locations, and events associated with particular resource usage behaviors. Such information can advantageously be used to predictively allocate resources of the computing device to an application even before a user has attempted to launch it. Furthermore, applications and/or application data may be loaded into memory at a point in time before the user is expected to access them.

Section II describes an example computing device that performs resource management based on device-specific or user-specific resource usage profiles in accordance with an embodiment, as well as associated methods. Section III describes how the example computing device of Section II may also enable dynamic resource management for multi-process applications. Section IV describes an example mobile device that may implement the resource management features described herein. Section V describes an example desktop computer that may implement the resource management features described herein. Section VI provides some concluding remarks.

II. Example System and Methods for Performing Resource Management Based on Device-Specific or User-Specific Resource Usage Profiles FIG. 1 is a block diagram of a computing device 100 that performs resource management based on device-specific or user-specific resource usage profiles in accordance with an embodiment. Computing device 100 is generally intended to represent a processor-based electronic device that is capable of running applications on behalf of a user. In one embodiment, computing device 100 comprises a mobile computing device such as a mobile phone (e.g., a smart phone), a laptop computer, a tablet computer, or a netbook. Computing device 100 may conceivably comprise other types of mobile computing devices such as a wearable computer (e.g., a head-mounted computer), a portable media player, a personal digital assistant, a personal navigation assistant, a handheld game console, or any other mobile device capable of running applications on behalf of a user. One example of a mobile device that may incorporate the functionality of computing device 100 will be discussed below in reference to FIG. 14. In another embodiment, computing device 100 comprises a desktop computer or other non-mobile computing platform that is capable of running applications on behalf of a user. An example desktop computer that may incorporate the functionality of computing device 100 will be discussed below in reference to FIG. 15.

As shown in FIG. 1, computing device 100 includes an application 102, an operating system 104, and a data store 106. In one embodiment, each of application 102 and operating system 104 comprise software components that are stored in memory of computing device 100 and executed therefrom by a processor (e.g., a microprocessor or other circuit operable to execute software instructions) that is communicatively connected to the memory. Such memory and processor comprise part of computing device 100 but have not been shown in FIG. 1 for simplicity's sake only. In further accordance with such an embodiment, application 102 and operating system 104 may each be persistently stored in non-volatile memory of computing device 100 and then temporarily transferred to volatile memory of computing device 100 for execution therefrom by the processor during powered operation of computing device 100.

Application 102 is intended to represent any one of a wide variety of computer programs that may be installed and executed upon computing device 100 to perform functions and/or provide features on behalf of a user thereof. Application 102 may represent, for example and without any limitation whatsoever, a telephony application, an e-mail application, a messaging application, a Web browsing application, a calendar application, a utility application, a game application, a social networking application, a music application, a productivity application, a lifestyle application, a reference application, a travel application, a sports application, a navigation application, a healthcare and fitness application, a news application, a photography application, a finance application, a business application, an education application, a weather application, an e-reader application, a medical application, or the like.

Operating system 104 comprises a set of computer programs that collectively manage resources and provide common services for applications executing on computing device 100. As shown in FIG. 1, operating system 104 includes drivers 110, a kernel 120, and system services 130. Drivers 110 comprise components that enable operating system 104 to interact with various hardware resources of computing device 100, such as CPU, system memory, and I/O devices. Kernel 120 utilizes drivers 110 to manage such hardware resources and other resources of computing device 100 and to allow other programs to run and use these resources. Kernel 120 may perform such operations as allocating processes to a CPU, allocating system memory to a particular process, and allocating I/O requests to appropriate devices. System services 130 are components that operate to service requests from applications for the various resources that may be allocated by kernel 120.

As shown in FIG. 1, kernel 120 includes a memory manager 122. Memory manager 122 controls how system memory of computing device 100 is utilized and performs operations that enable other processes to access system memory as they require it. Among other operations, memory manager 122 may maintain a virtual addressing scheme and perform paging so that processes can use more system memory than is physically available. To manage system memory, memory manager 122 interacts with a memory driver 112, which is one of drivers 110.

As further shown in FIG. 1, system services 130 include a resource manager 132. As will be discussed in more detail herein, resource manager 132 is a component that operates to determine an amount of a resource to be allocated to an application wherein such determination may be based on a resource usage profile for the application and to allocate the amount of the resource if it is available. In the description that follows, it will be assumed that the resource to be allocated to the application is system memory—however, it is to be understood that the resource management techniques described herein can be readily extended to any other resource of computing device 100, including but not limited to CPU, volatile memory other than system memory, non-volatile memory, a network resource, an I/O resource, a power resource (e.g., battery power or power from some other power supply), and a sensor resource (e.g., a camera or microphone).

Data store 106 comprises a collection of data that is stored in volatile or non-volatile memory of computing device 100. As will be explained herein, data store 106 is used by resource manager 132 to store resource usage profiles for applications that may be installed and executed on computing device 100. In accordance with certain example implementations, data store 106 may comprise a register or a database.

When application 102 is to be launched (e.g., in response to user activation thereof or some other event), one or more system service calls are placed on behalf of application 102 to system services 130 to request that application 102 be allocated the resources that are necessary for application 102 to properly execute. In response to the call(s), resource manager 132 operates to determine if the necessary resources are available and, if such resources are available, to cause them to be allocated to application 102.

In the case of system memory, resource manager 132 determines the amount of system memory to allocate to application 102 by attempting to access a resource usage profile for application 102 that may be stored in data store 106. In an embodiment, such resource usage profile for application 102 includes a predicted resource usage amount that specifies an amount of system memory that application 102 is expected to use during execution. Alternatively, the resource usage profile application 102 may include data from which such a predicted resource usage amount can be derived. In a further embodiment, if no resource usage profile exists for application 102 in data store 106, a default predicted resource usage amount may be assigned to application 102. Such default predicted resource usage amount may be the same for all applications, or may vary by application type.

Once resource manager 132 determines the predicted resource usage amount for application 102, resource manager 132 then communicates with memory manager 122 to determine if the predicted resource usage amount is currently available. If the predicted resource usage amount is currently available, then resource manager 132 will allocate the predicted resource usage amount to application 102 and application 102 may be permitted to execute. However, if the predicted resource usage amount is not currently available, then resource manager 132 may prevent application 102 from executing. Furthermore, if the predicted resource usage amount is not currently available, resource manager 132 may also terminate one or more other processes that are currently executing on computing device in order to free up system memory for application 102. Such other processes may be processes that have been assigned a lower priority than application 102 in accordance with a process priority scheme. Once sufficient system memory has been recaptured in this manner, then resource manager 132 may permit application 102 to execute.

After application 102 has begun executing, resource manager 132 will monitor how much system memory application 102 is actually using. In this way, resource manager 132 may determine that application 102 is utilizing more system memory than was originally allocated to it in accordance with the predicted resource usage amount. In this case, resource manager 132 may attempt to terminate one or more processes that are concurrently executing on computing device 100 in order to ensure that sufficient system memory is available for application 102 to execute properly. Resource manager 132 may also terminate the execution of application 102 if it determines that application 102 is exceeding a predefined upper limit on system memory usage or if it otherwise determines that the amount of system memory usage by application 102 is unacceptable.

Resource manager 132 will also utilize the information it obtains by monitoring how much system memory is being used by application 102 to update the predicted resource usage amount stored in data store 106 for application 102. Various algorithms for updating the predicted resource usage amount will be described in detail below. In this manner, resource manager 132 can automatically fine-tune the allocation of resources for application 102 over time in a way that responds to how application 102 behaves and is being utilized by a user of computing device 100. This beneficially enables computing device 100 to provide a better user experience and improved performance particularly during multi-tasking scenarios.

The manner in which resource manager 132 operates to manage a resource of computing device 100 in accordance with a device-specific or user-specific resource usage profile will now be described in reference to flowchart 200 of FIG. 2. Although the steps of flowchart 200 will be described with continued reference to the components of computing device 100 of FIG. 1, it is to be understood that the method may be performed by other components entirely.

Figure 2:
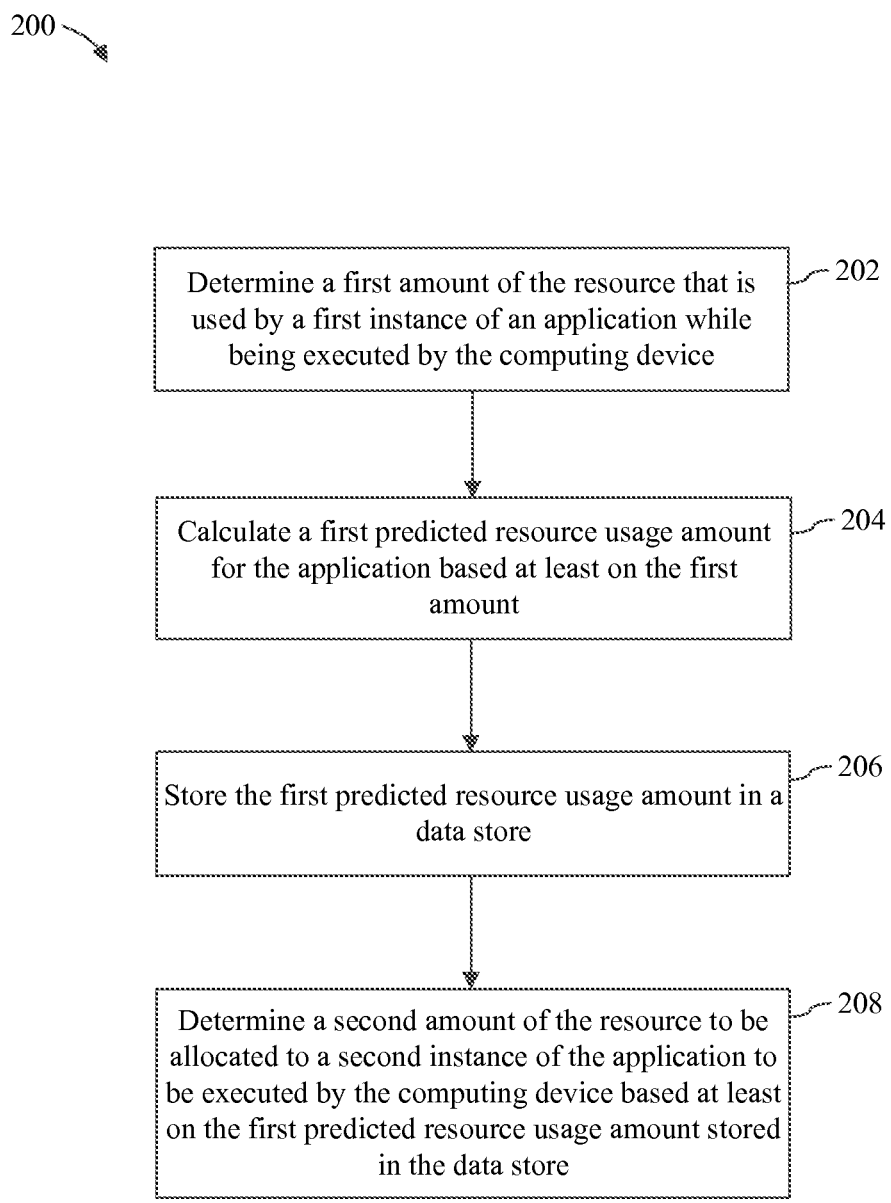
FIG. 2 depicts a flowchart of a method implemented by a computing device for managing a resource thereof in accordance with a device-specific or user-specific resource usage profile in accordance with an embodiment.

As shown in FIG. 2, the method of flowchart 200 begins at step 202 in which resource manager 132 determines a first amount of the resource that is used by a first instance of an application while being executed by computing device 100. For example, as mentioned above, resource manager 132 may determine a first amount of system memory that is being used by a first instance of application 102 while the first instance of application 102 is being executed by computing device 100.

In an embodiment, resource manager 132 determines the first amount by determining an amount of the resource that is used by a foreground process associated with the first instance of the application and one or more background tasks associated with the first instance of the application. The foreground process may be a process that is currently providing a user interface for the first instance of the application and occupying at least a portion of a display associated with computing device 100. However, execution of many modern applications also entails the execution of one or more background processes (also referred to herein as background tasks). Such background tasks may be executed concurrently with the foreground process and in some cases may be initiated by the foreground process. Examples of such background tasks include but are by no means limited to generating background audio, conducting a Voice over Internet Protocol (VoIP) call, synchronizing e-mails, content sharing, or the like. Like the foreground process, these background tasks consume system resources. However, conventional notions of application resource usage do not typically encompass resources consumed by such background tasks. An embodiment advantageously addresses this by tracking resource usage by both a foreground process associated with an executing application and one or more background tasks associated with the same application and combining both types of resource usage to obtain a total resource usage amount for the application.

At step 204, resource manager 132 calculates a first predicted resource usage amount for the application based at least on the first amount. For example, resource manager 132 may calculate a first predicted system memory usage amount for application 102 based at least on the first amount. Various example algorithms will be provide below to demonstrate how this step may be performed.

At step 206, resource manager 132 stores the first predicted resource usage amount in data store 106. For example, resource manager 132 may store the first predicted system memory usage amount for application 102 in data store 106.

At some time after the performance of step 206, resource manager 132 is notified that a second instance of the application is to be executed on computing device 100. In step 208, resource manager 132 determines a second amount of the resource to be allocated to the second instance of the application based at least on the first predicted resource usage amount stored in data store 106. For example, resource manager 132 may determine a second amount of system memory to be allocated to a second instance of application 102 based at least on the first predicted system memory usage amount stored for application 102 in data store 106. Determining the second amount of system memory may comprise, for example, setting the second amount of system memory to the first predicted system memory usage amount.

Various methods may be used to calculate the first predicted resource usage amount for the application in step 204. For example, in one embodiment, the first predicted resource usage amount is calculated based on the maximum resource amount that was used by the application over a certain number of executions. This approach is represented by flowchart 300 of FIG. 3.

Figure 3:
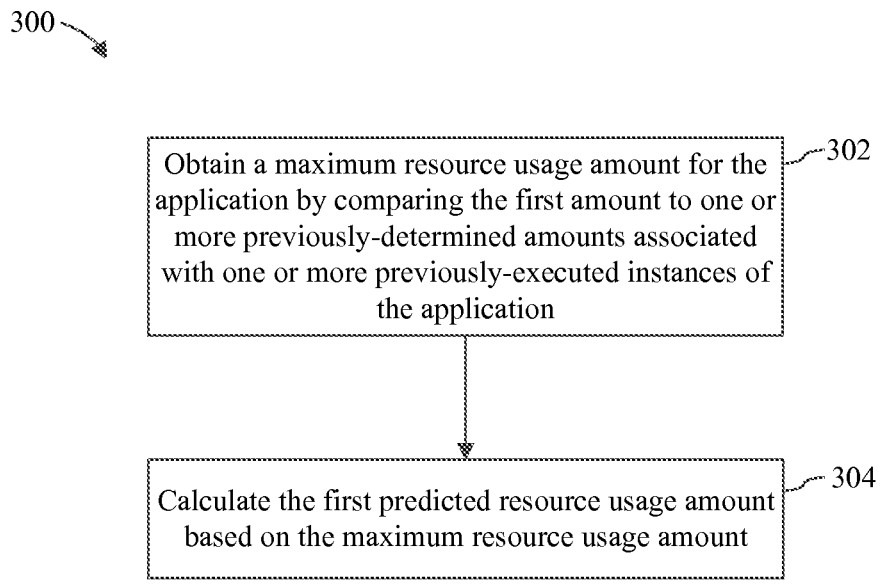
FIG. 3 depicts a flowchart of a method for calculating a predicted resource usage amount for an application in accordance with one embodiment.

In particular, FIG. 3 depicts a flowchart 300 of a method for calculating a predicted resource usage amount for an application in accordance with an embodiment. As shown in FIG. 3, the method of flowchart 300 begins at step 302, in which resource manager 132 obtains a maximum resource usage amount for the application by comparing the first amount determined during step 202 to one or more previously-determined amounts associated with one or more previously-executed instances of the application. At step 304, resource manager 132 calculates the first predicted resource usage amount based on the maximum resource usage amount.

An example of this approach will now be provided. In accordance with this example, resource manager 132 tracks system memory usage by application 102 during five distinct executions thereof and selects the maximum system memory usage by application 102 over such executions as the predicted resource usage amount. For example, assume that during the last four executions of application 102, application 102 used 100 MB, 120 MB, 160 MB and 140 MB of system memory, respectively. Then during step 202, resource manager 132 determines that the currently-executing instance of application 102 is using 150 MB of system memory. In this case, resource manager 132 may set the first predicted resource usage amount to 160 MB (or perhaps 160 MB plus some buffer amount), since that is the maximum system memory usage by application 102 over the last five executions thereof.

In another embodiment, the first predicted resource usage amount is calculated based on average resource amount used by the application over a certain number of executions. This approach is represented by flowchart 400 of FIG. 4.

Figure 4:
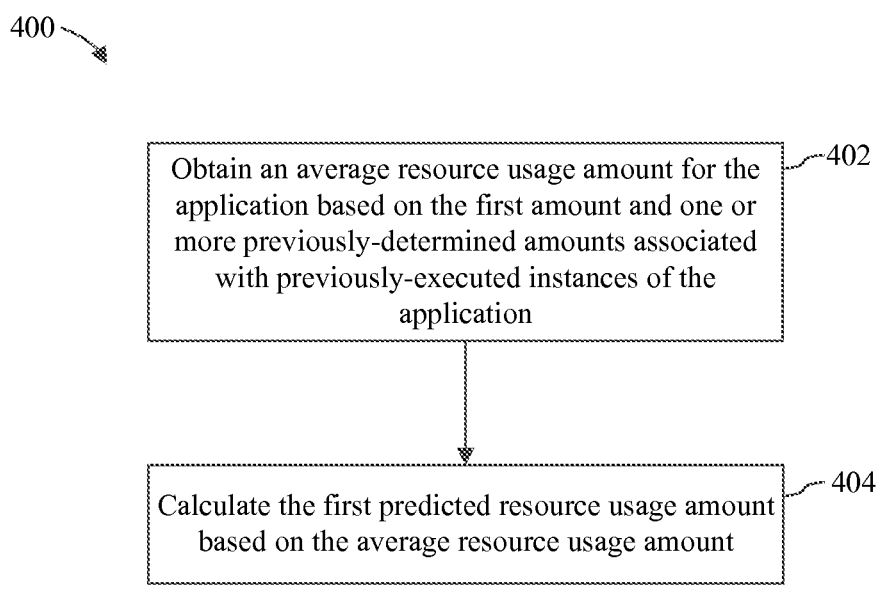
FIG. 4 depicts a flowchart of a method for calculating a predicted resource usage amount for an application in accordance with another embodiment.

In particular, FIG. 4 depicts a flowchart 400 of a method for calculating a predicted resource usage amount for an application in accordance with an embodiment. As shown in FIG. 4, the method of flowchart 400 begins at step 402, in which resource manager 132 obtains an average resource usage amount for the application based on the first amount determined during step 202 and one or more previously-determined amounts associated with one or more previously-executed instances of the application. At step 404, resource manager 132 calculates the first predicted resource usage amount based on the average resource usage amount.

An example of this approach will now be provided. In accordance with this example, resource manager 132 tracks system memory usage by application 102 during five distinct executions thereof, calculates an average of those values, and then uses the average value as the predicted resource usage amount. For example, assume that during the last four executions of application 102, application 102 used 100 MB, 120 MB, 160 MB and 140 MB of system memory, respectively. Then during step 202, resource manager 132 determines that the currently-executing instance of application 102 is using 150 MB of system memory. In this case, resource manager 132 will determine that the average resource usage amount for application 102 is ((100 MB+120 MB+160 MB+140 MB+150 MB)/5), which equals 134 MB. Consequently, resource manager 132 may set the first predicted resource usage amount to 134 MB (or perhaps 134 MB plus some buffer amount).

Another method by which the average resource usage amount described in step 402 may be obtained will now be described. In accordance with this approach, a running average of the resource usage amount is combined with the most recent resource usage amount to obtain a new long-term running average. The combination may be weighted such that a greater weight is applied to either the old long-term running average or the most recent resource usage amount. Alternatively, both amounts may be equally weighted. This approach may be represented using the following equation:

$$R_{AVG\_NEW} = \alpha R_{AVG\_OLD} + (1-\alpha) R_{NEW}$$

wherein $R_{AVG\_NEW}$ represents the new running average of the resource usage amount, $R_{AVG\_OLD}$ represents the old running average of the resource usage amount, $R_{NEW}$ represents the most recently observed resource usage amount, and $\alpha$ is the variable that determines the weighting.

For example, assume that the old running average of the resource usage amount, $R_{AVG\_OLD}$, is equal to 130 MB, the most recently observed resource usage amount, $R_{AVG\_NEW}$, is 160 MB, and the weighting factor $\alpha$ is 0.25. In this case, the new running average of the resource usage amount, $R_{AVG\_NEW}$, would be equal to ((0.25*130 MB)+(0.75*160 MB)), which is 152.5 MB. Consequently, resource manager 132 may set the first predicted resource usage amount to 152.5 MB (or perhaps 152.5 MB plus some buffer amount).

Figure 5:
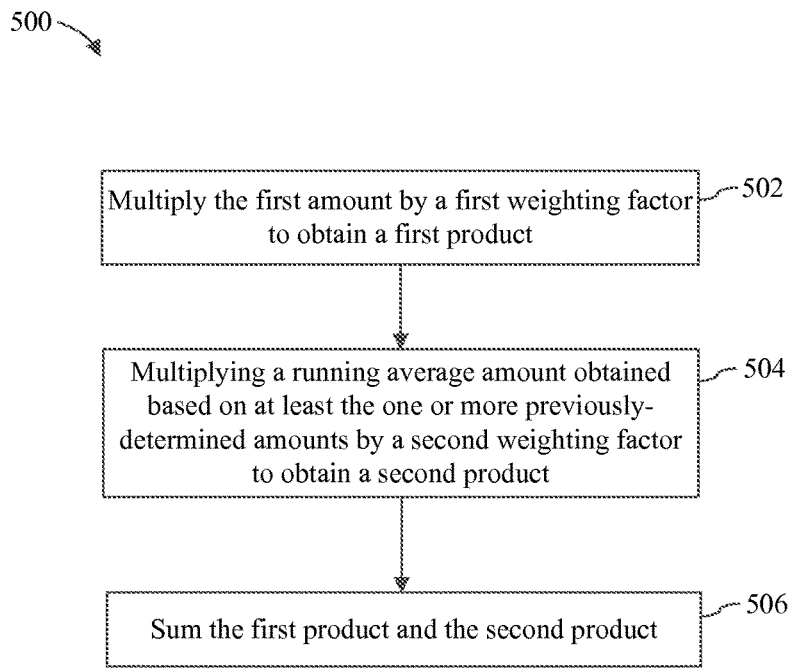
FIG. 5 depicts a flowchart of a method of obtaining an average resource usage amount for an application in accordance with an embodiment.

The foregoing method of obtaining an average resource usage amount for an application using running averages is depicted in flowchart 500 of FIG. 5. As shown in FIG. 5, the method of flowchart 500 begins at step 502, in which resource manager 132 multiplies the first amount obtained during step 202 (i.e., the most recently observed resource usage amount) by a first weighting factor. During step 504, resource manager 132 multiplies a running average resource usage amount that was obtained based on at least the one or more previously-determined amounts (i.e., the previously observed resource usage amounts) by a second weighting factor to obtain a second product. At step 506, resource manager 132 sums the first product and the second product to obtain the new average resource usage amount.

As noted above in reference to FIG. 2, at step 208 of flowchart 200, resource manager 132 determines a second amount of a resource (e.g., system memory) to be allocated to a second instance of the application to be executed by computing device 100 based at least on the first predicted resource usage amount. Since the second amount is an estimate based on a predictive algorithm, it is always possible that the second instance of the application may consume more than the allocated second amount. To address this scenario, resource manager 132 may be configured to determine that the second instance of the application is consuming more than its allocated share of resources and, in response, may terminate other processes that are concurrently executing on computing device 100 to free up resources. For example, resource manager 132 may cause certain processes that have been assigned a lower priority than the application in accordance with a process priority scheme to be terminated.

Figure 6:
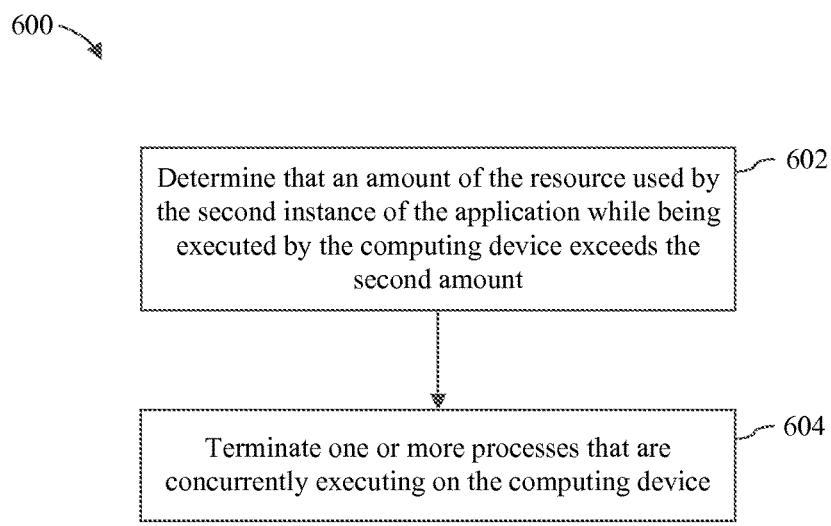
FIG. 6 depicts a flowchart of additional steps that may be performed in accordance with the method of the flowchart shown in FIG. 2.

This process is depicted in flowchart 600 of FIG. 6. In particular, as shown in FIG. 6, the method of flowchart 600 begins at step 602, in which resource manager 132 determines that an amount of the resource used by the second instance of the application while being executed by computing device 100 exceeds the second amount. In response to this determination, at step 604, resource manager 132 terminates one or more processes that are concurrently executing on the computing device. Additionally or alternatively, resource manager 132 may communicate with one or more processes that are concurrently executing on computing device 100 and instruct those processes to reduce their consumption of the resource.

It is also possible that resource manager 132 may determine via communication with memory manager 122 or some other means that the second amount of the resource to be allocated to the second instance of the application is not currently available. In this case, resource manager 132 may prevent execution of the second instance of the application.

Figure 7:
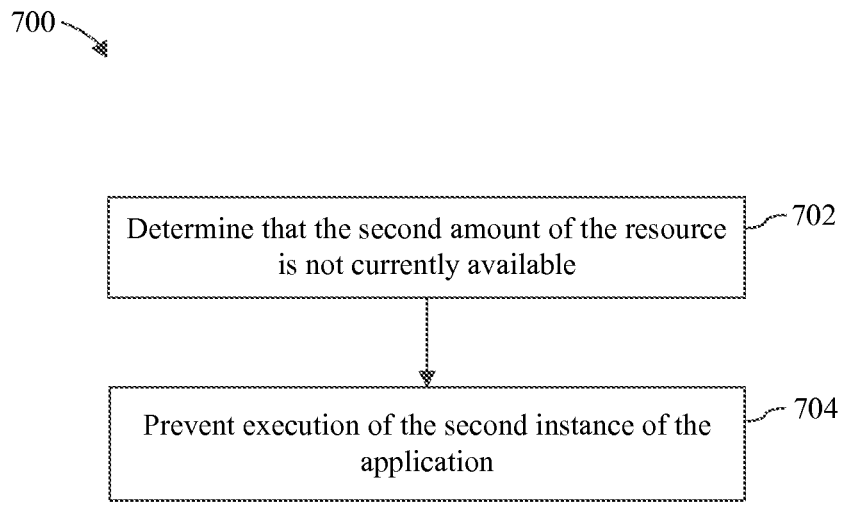
FIG. 7 depicts a flowchart of additional steps that may be performed in accordance with the method of the flowchart shown in FIG. 2.

This process is depicted in flowchart 700 of FIG. 7. In particular, as shown in FIG. 7, the method of flowchart 700 begins at step 702, in which resource manager 132 determines that the second amount of the resource is not currently available. In response to this determination, at step 704, resource manager 132 prevents execution of the second instance of the application.

In the case where resource manager 132 determines that the second amount of the resource to be allocated to the second instance of the application is not currently available, resource manager 132 may also terminate one or more processes that are executing on computing device 100 to free up the resource. For example, resource manager 132 may cause certain processes that have been assigned a lower priority than the application in accordance with a process priority scheme to be terminated. After the resource consumption by such other processes has been reduced resource manager 132 may then allow the second instance of the application to execute.

Figure 8:
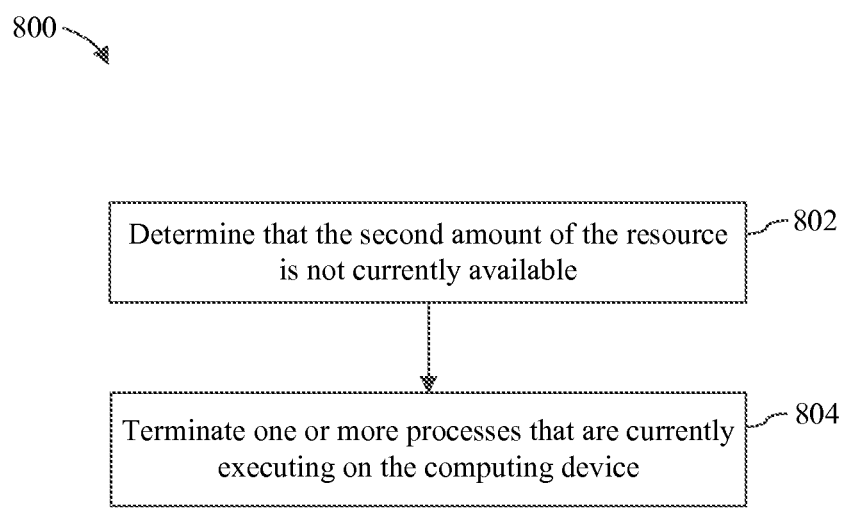
FIG. 8 depicts a flowchart of additional steps that may be performed in accordance with the method of the flowchart shown in FIG. 2.

This process is depicted in flowchart 800 of FIG. 8. In particular, as shown in FIG. 8, the method of flowchart 800 begins at step 802, in which resource manager 132 determines that the second amount of the resource is not currently available. In response to this determination, at step 804, resource manager 132 terminates one or more processes that are currently executing on computing device 100. Additionally or alternatively, resource manager 132 may communicate with one or more processes that are currently executing on computing device 100 and instruct those processes to reduce their consumption of the resource.

For many computing devices, such as smartphones, the typical usage model is one user per computing device. In this case, storing resource usage profiles for the computing device is essentially the same as storing resource usage profiles for a particular user. However, computing devices may also be used to support multiple users. For example, a number of different members of the same household may each use the same tablet computer, desktop computer, or gaming console to run applications. Each of these users may use different applications or may use the same application in different ways, resulting in varying levels of resource consumption. To address this scenario, certain embodiments store resource usage profiles on a computing device by both application and user, so that the predictive allocation of resources can be tailored to the particular user that is currently using the computing device. These resource usage profiles may be thought of as user-specific resource usage profiles (as opposed to the previously described device-specific resource usage profiles).

Figure 9:
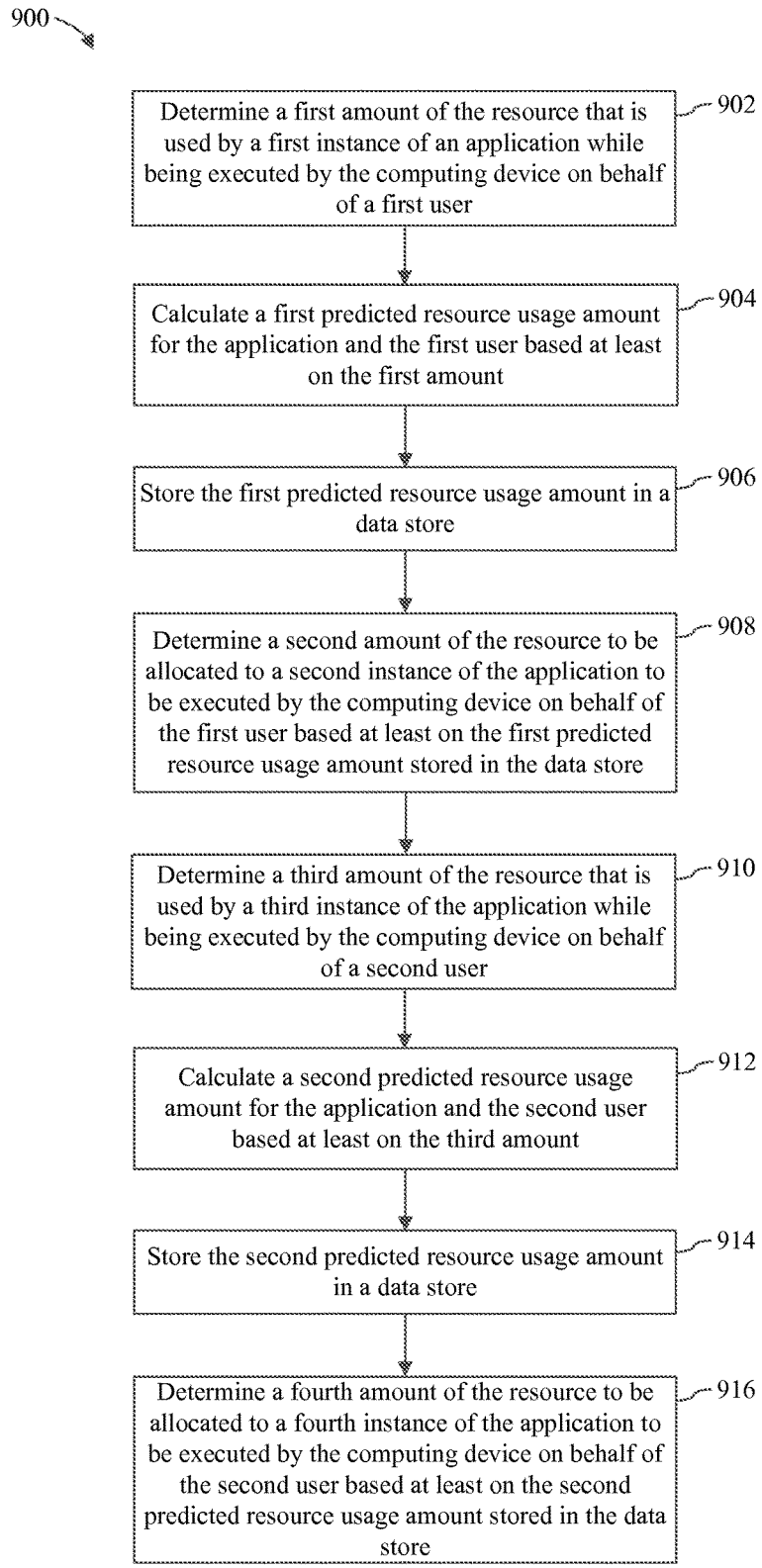
FIG. 9 depicts a flowchart of a method implemented by a computing device for managing a resource thereof in accordance with a user-specific resource usage profile in accordance with an embodiment.

FIG. 9 depicts a flowchart 900 of a method implemented by a computing device for managing a resource thereof in accordance with a user-specific resource usage profile in accordance with an embodiment. The method of flowchart 900 will now be described with continued reference to the components of computing device 100 as described above in reference to FIG. 1. However, the method is not limited to that embodiment.

As shown in FIG. 9, the method of flowchart 900 begins at step 902 in which resource manager 132 determines a first amount of the resource that is used by a first instance of an application while being executed by computing device 100 on behalf of a first user. For example, resource manager 132 may determine a first amount of system memory that is being used by a first instance of application 102 while the first instance of application 102 is being executed by computing device 100 on behalf of the first user. The fact that the first instance of application 102 is being executed on behalf of the first user may be determined in any of a wide variety of ways. In an embodiment in which a user may log into computing device 100, the current login information may be used to make the determination. However, this example is not intended to be limiting, and any suitable method for determining the identity of a user of a computing device may be used.

At step 904, resource manager 132 calculates a first predicted resource usage amount for the application and the first user based at least on the first amount. For example, resource manager 132 may calculate a first predicted system memory usage amount for application 102 and the first user based at least on the first amount. Various example algorithms were previously provided to demonstrate how this step may be performed.

At step 906, resource manager 132 stores the first predicted resource usage amount in data store 106. For example, resource manager 132 may store the first predicted system memory usage amount for application 102 and the first user in data store 106.

At some time after the performance of step 906, resource manager 132 is notified that a second instance of the application is to be executed on computing device 100 on behalf of the first user. In step 908, resource manager 132 determines a second amount of the resource to be allocated to the second instance of the application based at least on the first predicted resource usage amount stored in data store 106. For example, resource manager 132 may determine a second amount of system memory to be allocated to a second instance of application 102 based at least on the first predicted system memory usage amount stored for application 102 and the first user in data store 106. Determining the second amount of system memory may comprise, for example, setting the second amount of system memory to the first predicted system memory usage amount.

At step 910, resource manager 132 determines a third amount of the resource that is used by a third instance of the application while being executed by computing device 100 on behalf of a second user, wherein the second user is different than the first user. For example, resource manager 132 may determine a third amount of system memory that is being used by a third instance of application 102 while the third instance of application 102 is being executed by computing device 100 on behalf of the second user. The fact that the third instance of application 102 is being executed on behalf of the second user may be determined in any of a wide variety of ways. In an embodiment in which a user may log into computing device 100, the current login information may be used to make the determination. However, this example is not intended to be limiting, and any suitable method for determining the identity of a user of a computing device may be used.

At step 912, resource manager 132 calculates a second predicted resource usage amount for the application and the second user based at least on the third amount. For example, resource manager 132 may calculate a first predicted system memory usage amount for application 102 and the second user based at least on the third amount. Various example algorithms were previously provided to demonstrate how this step may be performed.

At step 914, resource manager 132 stores the second predicted resource usage amount in data store 106. For example, resource manager 132 may store the second predicted system memory usage amount for application 102 and the second user in data store 106.

At some time after the performance of step 914, resource manager 132 is notified that a fourth instance of the application is to be executed on computing device 100 on behalf of the second user. In step 916, resource manager 132 determines a fourth amount of the resource to be allocated to the fourth instance of the application based at least on the second predicted resource usage amount stored in data store 106. For example, resource manager 132 may determine a fourth amount of system memory to be allocated to a fourth instance of application 102 based at least on the second predicted system memory usage amount stored for application 102 and the second user in data store 106. Determining the fourth amount of system memory may comprise, for example, setting the fourth amount of system memory to the second predicted system memory usage amount.

Figure 10:
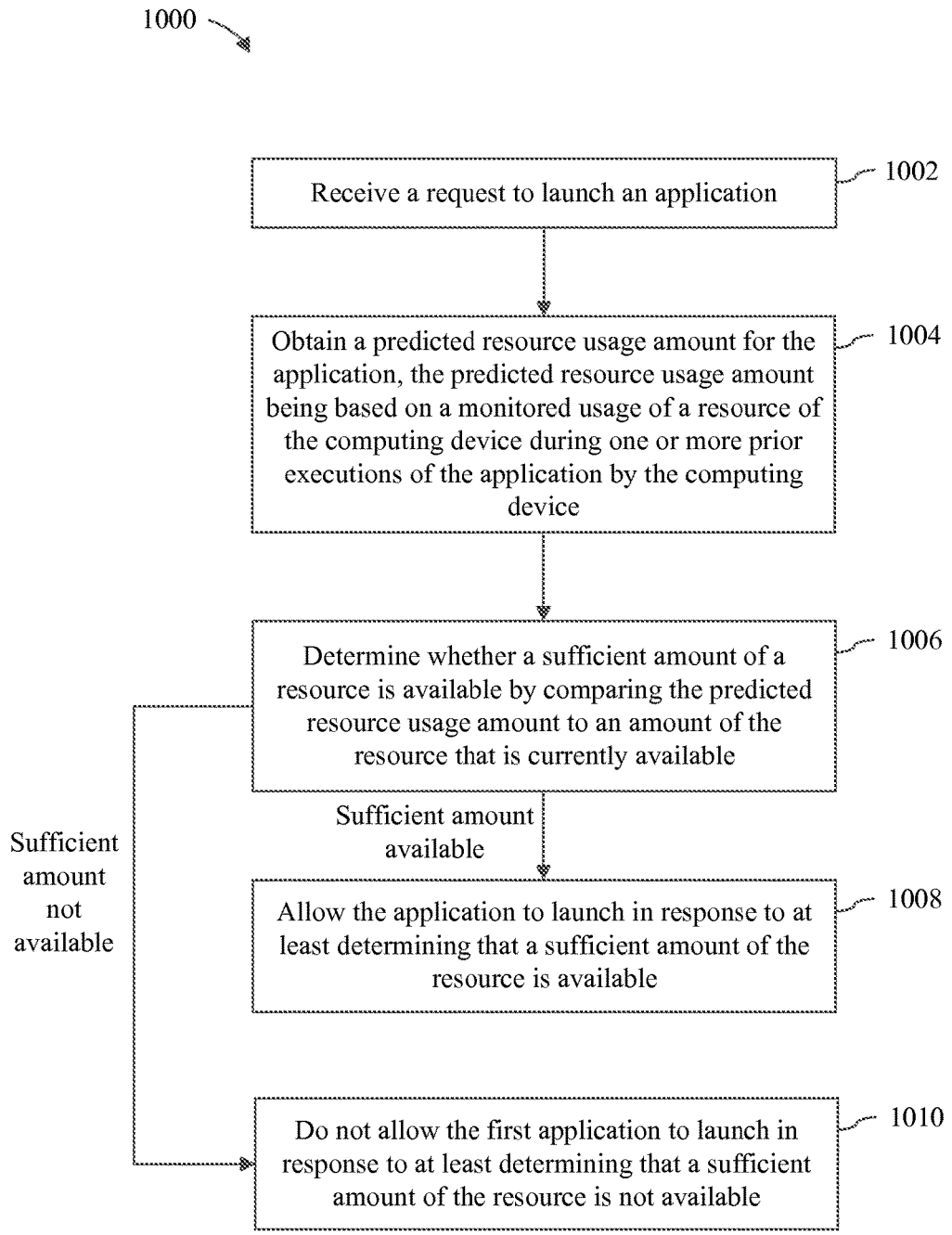
FIG. 10 depicts a flowchart of a method for managing the launching of an application in accordance with a device-specific or user-specific resource usage profile in accordance with an embodiment.

FIG. 10 depicts a flowchart 1000 of a method for managing the launching of an application in accordance with a device-specific or user-specific resource usage profile in accordance with an embodiment. The method of flowchart 1000 will now be described with continued reference to the components of computing device 100 as described above in reference to FIG. 1. However, the method is not limited to that embodiment.

As shown in FIG. 10, the method of flowchart 1000 begins at step 1002 in which a request is received to launch an application. For example, a request to launch application 102 may be received, for example, by system services 130 and/or by resource manager 132.

At step 1004, resource manager 132 obtains a predicted resource usage amount for the application. For example, resource manager 132 may obtain a predicted resource usage amount for application 102. The predicted resource usage amount is based on a monitored usage of a resource of computing device 100 during one or more prior executions of the application by computing device 100. The predicted resource usage amount, or the information required to calculate such predicted resource usage amount, may be obtained from a resource usage profile for the application, which may be stored in data store 206. The resource may include one or more of a volatile or non-volatile memory resource, a CPU resource, an I/O resource, a network resource, a power resource, and a sensor resource. The predicted resource usage amount may be based on monitoring the usage of resource of computing device 100 by both a foreground process associated with an application and one or more background tasks associated with the application.

At decision step 1006, resource manager 132 determines whether a sufficient amount of the resource is available by comparing the predicted resource usage amount to an amount of the resource that is currently available. For example, in an embodiment in which the resource is system memory, resource manager 132 may obtain the amount of system memory that is currently available from memory manager 122, and then compare the predicted system memory usage amount for the application to the currently available system memory to determine if a sufficient amount of system memory is available.

If resource manager 132 at least determines that a sufficient amount of the resource is available, then resource manager 132 will allow the application to launch as shown at step 1008. For example, if resource manager 132 at least determines that sufficient system memory is available, then resource manager 132 will allow application 102 to launch. It is noted that there may be other conditions that must be fulfilled in order for resource manager 132 to allow the application to launch.

If resource manager 132 determines that a sufficient amount of the resource is not available, then resource manager 132 will not allow the application to launch as shown at step 1010. For example, if resource manager 132 determines that sufficient system memory is not available, then resource manager 132 will not allow application 102 to launch. Additionally, resource manager 132 may seek to free up resources by causing one or more currently executing processes to terminate or otherwise reduce their resource usage.

In an embodiment, resource manager 132 is also capable of tracking other information related to resource usage by an application and/or user, such as times, locations, and events associated with particular resource usage behaviors. Such information can advantageously be used to predictively allocate resources of the computing device to an application even before a user has attempted to launch it. Furthermore, applications and/or application data may be loaded into memory at a point in time before the user is expected to access them.

For example, if it can be determined that a user is likely to launch a particular application at a particular time, a particular place, or in association with a particular event, then resource manager 132 can operate to ensure that sufficient resources are available to be allocated to the application before, and perhaps immediately before, the user is expected to launch the application. Furthermore, such a predictive analysis can actually be used to load an application or application content into system memory so that the user can obtain immediate access to the application and its features.

Figure 11:
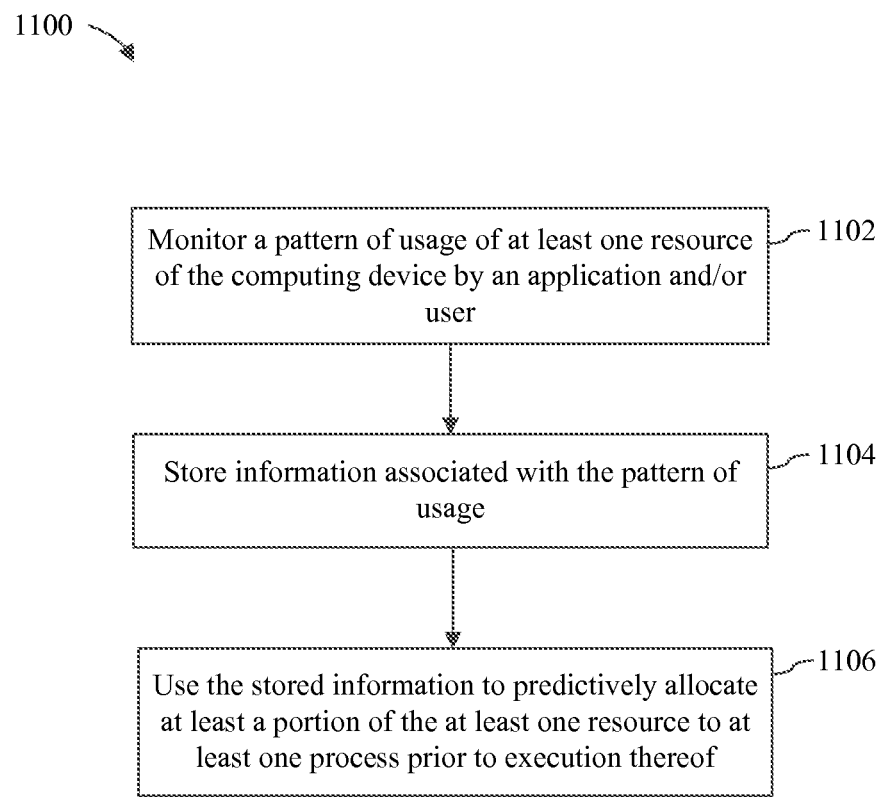
FIG. 11 depicts a flowchart of a method for using monitored resource usage patterns of a user with respect to the resources of a computing device and information derived therefrom to predictively allocate resources to processes.

To help illustrate this, FIG. 11 depicts a flowchart 1100 of a method for using monitored resource usage patterns of a user with respect to the resources of a computing device and information derived therefrom to predictively allocate resources to processes. The method of flowchart 1100 will now be described with continued reference to the components of computing device 100 as described above in reference to FIG. 1. However, the method is not limited to that embodiment.

As shown in FIG. 11, the method of flowchart 1100 begins at step 1102, in which resource manager 132 monitors a pattern of usage of at least one resource of computing device 100 by an application and/or user. As previously discussed, monitoring the pattern of usage may entail monitoring resource usage by an application and/or user as well as monitoring other information associated with such resource usage, such as times, locations, and events associated with particular resource usage behaviors.

At step 1104, resource manager 132 stores information associated with the pattern of usage. Resource manager 132 may store such information, for example, in data store 106.

At step 1106, resource manager 132 uses the stored information to predictively allocate at least a portion of the at least one resource to at least one process prior to execution thereof by computing device 100. In one example embodiment, during step 1106, resource manager 132 predictively allocates at least a portion of the resource to an application prior to a user of computing device 100 or any other entity launching the application. In another example embodiment in which the at least one resource includes system memory, resource manager 132 may load at least a portion of an application or data associated with the application into the predictively-allocated system memory prior to a user of computing device 100 or any other entity launching the application. These examples are provided by way of illustration only and are not intended to be limiting. Persons skilled in the relevant art(s) will appreciate that still other techniques may be used to leverage the resource usage pattern information for performing additional resource management tasks. In accordance with certain embodiments, resources may be predictively allocated and applications and/or application data may be loaded into memory for a particular user based on general usage patterns determined by collecting data from a wide variety of users and computing devices. Then, such allocations and loading may be fine-tuned based on the behaviors of the particular user.

III. Example System and Methods for Dynamic Resource Management for Multi-Process Applications In an embodiment, computing device 100 of FIG. 1 enables an application executing thereon (e.g., application 102) to dynamically control how an allocated portion of a resource of computing device 100 is to be divided among multiple processes associated with the application. For example, application 102 executing on computing device 100 may interact with resource manager 132 to dynamically control how an allocated portion of a resource of computing device 100 is to be divided among a foreground process associated with the application and one or more background processes associated with the application. By providing an application with this ability, embodiments described herein advantageously allow applications to adapt to changing resource allocations and better coexist with other processes that may be executing on the computing device, thereby better enabling a wide variety of multi-tasking scenarios.

Figure 12:
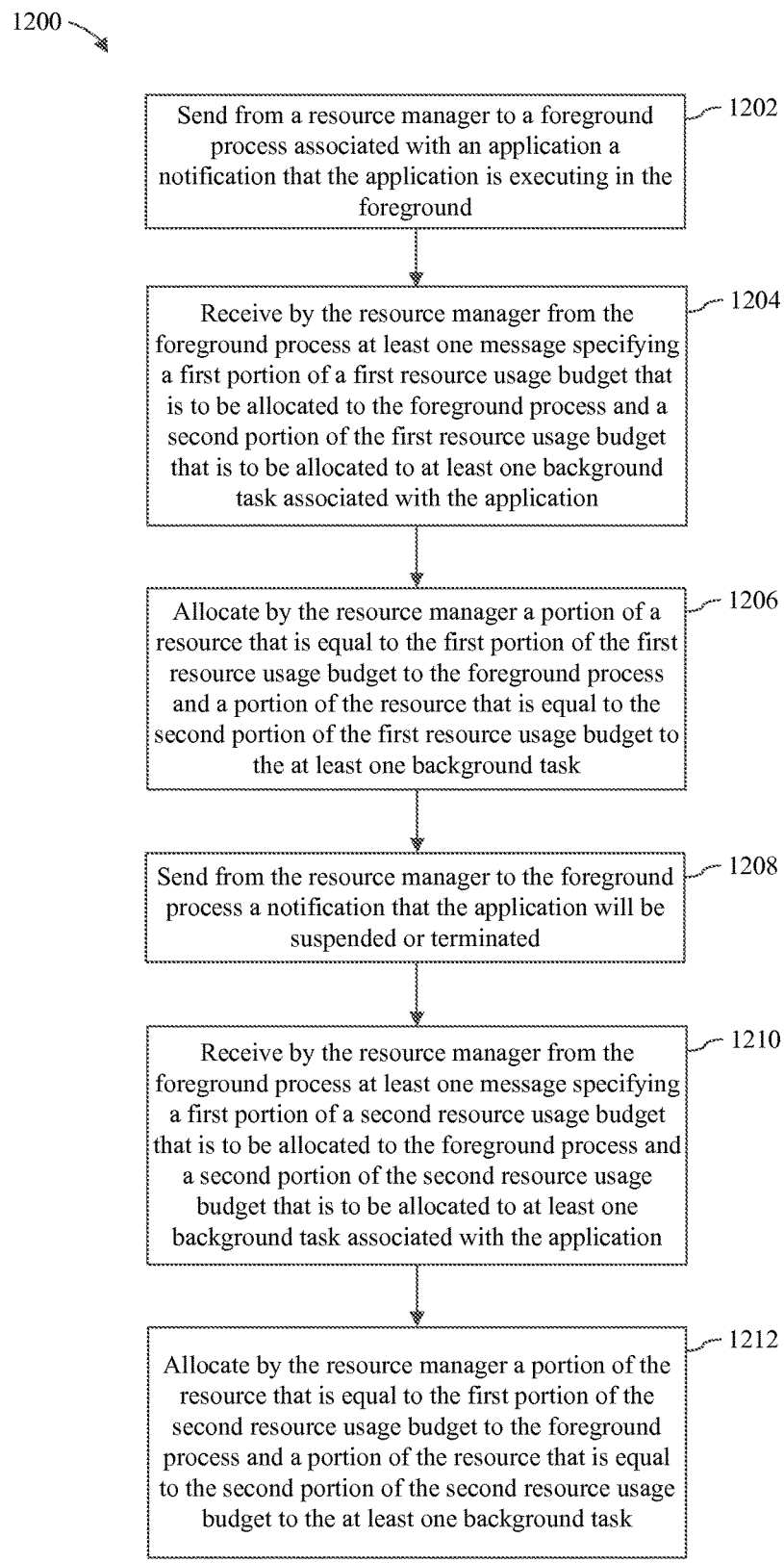
FIG. 12 depicts a flowchart of one method for enabling an application executing on a computing device to assist in managing an allocation of resources of the computing device to a foreground process and one or more background tasks associated with the application.

One manner in which application 102 and resource manager 132 may interact to conduct such dynamic resource management will now be described in reference to flowchart 1200 of FIG. 12. As shown in FIG. 12, the method of flowchart 1200 begins at step 1202, in which resource manager 1202 sends to a foreground process associated with application 102 a notification that the application is executing in the foreground.

At step 1204, resource manager 132 receives from the foreground process at least one message specifying a first portion of a first resource usage budget that is to be allocated to the foreground process and a second portion of the first resource usage budget that is to be allocated to at least one background task associated with the application.

At step 1206, resource manager 132 allocates a portion of the resource that is equal to the first portion of the first resource usage budget to the foreground process and allocates a portion of the resource that is equal to the second portion of the first resource usage budget to the at least one background task. The resource may comprise, for example and without limitation, volatile or non-volatile memory, CPU, an I/O resource, a network resource, a power resource, a sensor resource.

At step 1208, resource manager 132 sends to the foreground process a notification that the application will be suspended or terminated.

At step 1210, resource manager 132 receives from the foreground process at least one message specifying a first portion of a second resource usage budget that is to be allocated to the foreground process and a second portion of the second resource usage budget that is to be allocated to at least one background task associated with the application. The second resource usage budget may be smaller than the first resource usage budget.

At step 1212, resource manager 132 allocates a portion of the resource that is equal to the first portion of the second resource usage budget to the foreground process and allocates a portion of the resource that is equal to the second portion of the second resource usage budget to the at least one background task. After a predetermined time period, resource manager 132 may then determine whether a sum of an amount of the resource being used by the foreground process and an amount of the resource being used by the at least one background process exceeds the second resource usage budget. In response to determining that the sum exceeds the second resource usage budget, resource manager 132 may cause one or more of the foreground process and the at least one background process to be terminated. Additionally or alternatively, resource manager 132 may predictively determine that the launching of one or more background processes that are associated with application 102 will cause the total resource usage to exceed the second resource usage budget. Based on this prediction, resource manager 132 may prevent the one or more background tasks from being launched until a later time.

In one embodiment, the communications exchanged between resource manager 132 and the foreground process in the foregoing method are exchanged via a shared API. Such API may be exposed to developers of applications so such developers can develop applications that can take advantage of these features.

Figure 13:
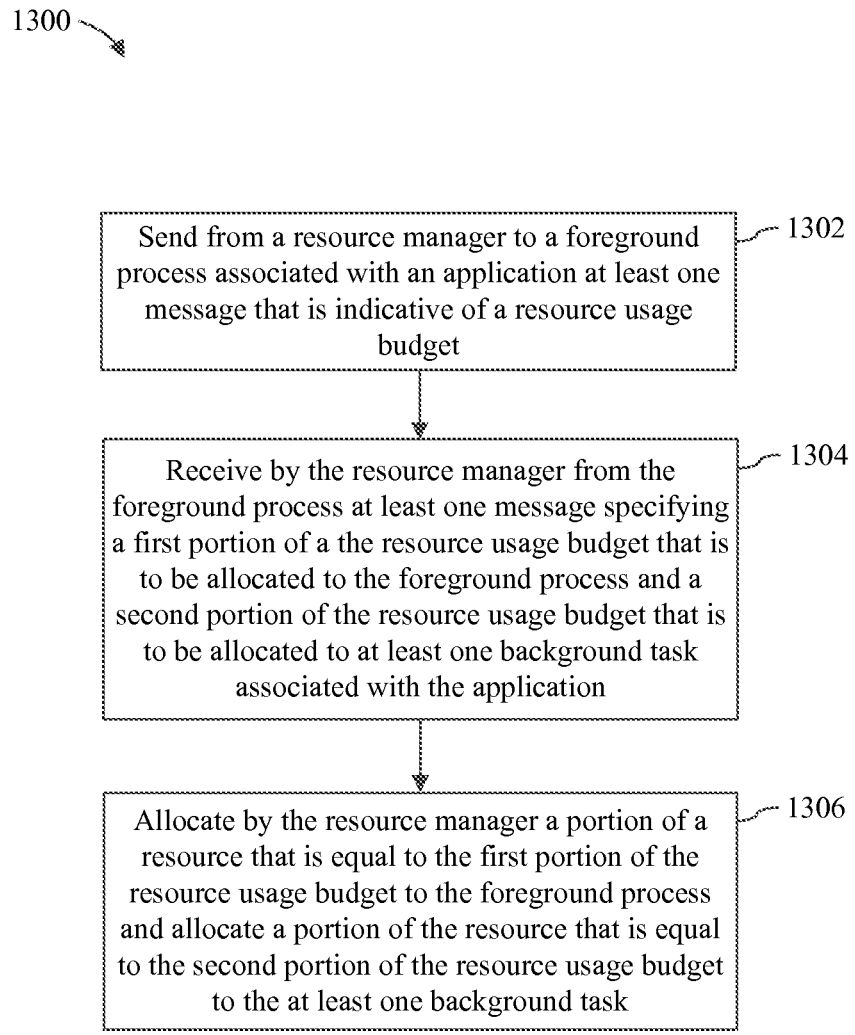
FIG. 13 depicts a flowchart of another method for enabling an application executing on a computing device to assist in managing an allocation of resources of the computing device to a foreground process and one or more background tasks associated with the application.

FIG. 13 depicts a flowchart 1300 of another method for enabling an application executing on a computing device to assist in managing an allocation of resources of the computing device to a foreground process and one or more background tasks associated with the application.

As shown in FIG. 13, flowchart 1300 begins at step 1302, in which resource manager 132 sends to a foreground process associated with an application at least one message that is indicative of a resource usage budget.

At step 1304, resource manager 132 receives from the foreground process at least one message specifying a first portion of the resource usage budget that is to be allocated to the foreground process and second portion of the resource usage budget that is to be allocated to at least one background task associated with the application.

At step 1306, resource manager 132 allocates a portion of a resource that is equal to the first portion of the resource usage budget to the foreground process and allocates a portion of the resource that is equal to the second portion of the resource usage budget to the at least one background task.

In an embodiment, the at least one message sent to the foreground process and the at least one message sent to the resource manager are sent via a shared API.

In another embodiment, the resource usage budget comprises a resource usage budget for an application that is executing in the foreground and the at least one message that is indicative of the resource usage budget comprises a notification that the application is executing in the foreground.

In yet another embodiment, the resource usage budget comprises a resource usage budget for an application that is suspended or terminated and the at least one message that is indicative of the resource usage budget comprises a notification that the application will be suspended or terminated.

In a further embodiment, resource manager 132 determines after a predetermined time period whether a sum of an amount of the resource being used by the foreground process and an amount of the resource being used by the at least one background process exceeds the resource usage budget and, in response to determining that the sum exceeds the resource usage budget, causes one or more of the foreground process and the at least one background process to be terminated.

IV. Example Mobile Device Implementation

Figure 14:
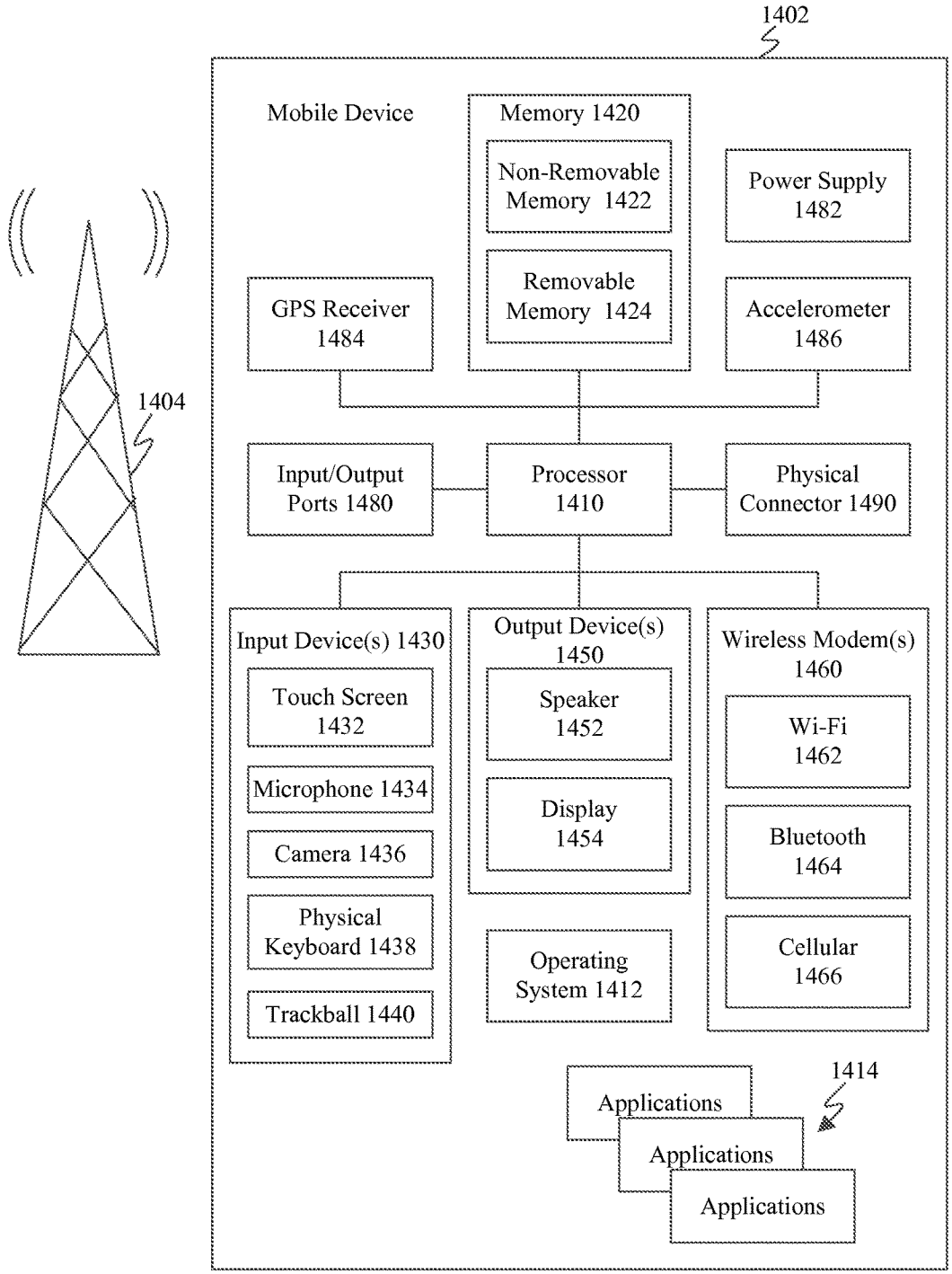
FIG. 14 is a block diagram of an example mobile device that may be used to implement various embodiments.

FIG. 14 is a block diagram of an exemplary mobile device 1402 that may implement embodiments described herein. As shown in FIG. 14, mobile device 1402 includes a variety of optional hardware and software components. Any component in mobile device 1402 can communicate with any other component, although not all connections are shown for ease of illustration. Mobile device 1402 can be any of a variety of computing devices (e.g., cell phone, smartphone, handheld computer, Personal Digital Assistant (PDA), etc.) and can allow wireless two-way communications with one or more mobile communications networks 1404, such as a cellular or satellite network, or with a local area or wide area network.

The illustrated mobile device 1402 can include a controller or processor 1410 (e.g., signal processor, microprocessor, ASIC, or other control and processing logic circuitry) for performing such tasks as signal coding, data processing, input/output processing, power control, and/or other functions. An operating system 1412 can control the allocation and usage of the components of mobile device 1402 and provide support for one or more application programs 1414 (also referred to as "applications" or "apps"). Application programs 1414 may include common mobile computing applications (e.g., e-mail applications, calendars, contact managers, Web browsers, messaging applications) and any other computing applications (e.g., word processing applications, mapping applications, media player applications).

The illustrated mobile device 1402 can include memory 1420. Memory 1420 can include non-removable memory 1422 and/or removable memory 1424. Non-removable memory 1422 can include RAM, ROM, flash memory, a hard disk, or other well-known memory devices or technologies. Removable memory 1424 can include flash memory or a Subscriber Identity Module (SIM) card, which is well known in GSM communication systems, or other well-known memory devices or technologies, such as "smart cards." Memory 1420 can be used for storing data and/or code for running operating system 1412 and applications 1414. Example data can include Web pages, text, images, sound files, video data, or other data to be sent to and/or received from one or more network servers or other devices via one or more wired or wireless networks. Memory 1420 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Mobile device 1402 can support one or more input devices 1430, such as a touch screen 1432, a microphone 1434, a camera 1436, a physical keyboard 1438 and/or a trackball 1440 and one or more output devices 1450, such as a speaker 1452 and a display 1454. Touch screens, such as touch screen 1432, can detect input in different ways. For example, capacitive touch screens detect touch input when an object (e.g., a fingertip) distorts or interrupts an electrical current running across the surface. As another example, touch screens can use optical sensors to detect touch input when beams from the optical sensors are interrupted. Physical contact with the surface of the screen is not necessary for input to be detected by some touch screens.

Other possible output devices (not shown) can include piezoelectric or other haptic output devices. Some devices can serve more than one input/output function. For example, touch screen 1432 and display 1454 can be combined in a single input/output device. The input devices 1430 can include a Natural User Interface (NUI).

Wireless modem(s) 1460 can be coupled to antenna(s) (not shown) and can support two-way communications between the processor 1410 and external devices, as is well understood in the art. The modem(s) 1460 are shown generically and can include a cellular modem 1466 for communicating with the mobile communication network 1404 and/or other radio-based modems (e.g., Bluetooth 1464 and/or Wi-Fi 1462). At least one of the wireless modem(s) 1460 is typically configured for communication with one or more cellular networks, such as a GSM network for data and voice communications within a single cellular network, between cellular networks, or between the mobile device and a public switched telephone network (PSTN).

Mobile device 1402 can further include at least one input/output port 1480, a power supply 1482, a satellite navigation system receiver 1484, such as a Global Positioning System (GPS) receiver, an accelerometer 1486, and/or a physical connector 1490, which can be a USB port, IEEE 1394 (FireWire) port, and/or RS-232 port. The illustrated components of mobile device 1402 are not required or all-inclusive, as any components can be deleted and other components can be added as would be recognized by one skilled in the art.

In an embodiment, certain components of mobile device 1402 are configured to perform the functions described herein relating to performing resource management based on device-specific or user-specific resource usage profiles and enabling dynamic resource management for multi-process applications. For example, in one embodiment, operating system 1412 includes the features of operating system 104 that enable operating system 104 to perform resource management based on device-specific or user-specific resource usage profiles. As a further example, operating system 1412 and at least one of applications 1414 may include the features of operating system 104 and application 102 that enable those components to perform dynamical resource management for multi-process applications. However, this is only an example and different functions may be performed by different components.

Computer program logic for performing the functions described herein relating to performing resource management based on device-specific or user-specific resource usage profiles and enabling dynamic resource management for multi-process applications may be stored in memory 1420 and executed by processor 1410. By executing such computer program logic, processor 1410 may be caused to implement any of the features of any of the components of computing device 100 as described above in reference to FIG. 1. Also, by executing such computer program logic, processor 1410 may be caused to perform any or all of the steps of any or all of the flowcharts depicted in FIGS. 2-13.

V. Example Computer System Implementation

Figure 15:
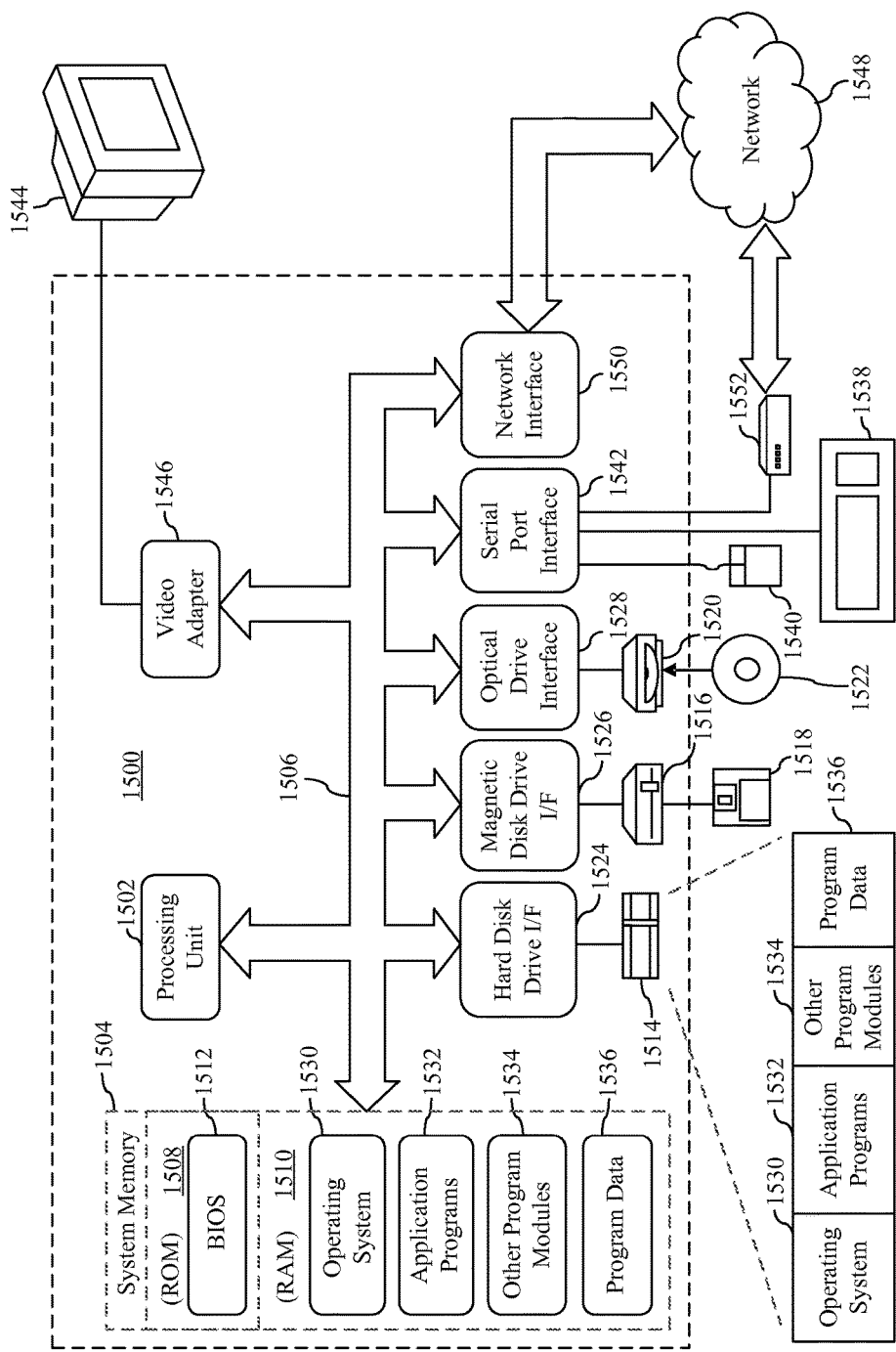
FIG. 15 is a block diagram of an example processor-based computer system that may be used to implement various embodiments.

FIG. 15 depicts an example processor-based computer system 1500 that may be used to implement various embodiments described herein. For example, system 1500 may be used to implement any of the components of computing device 100 as described above in reference to FIG. 1. System 1500 may also be used to implement any or all of the steps of any or all of the flowcharts depicted in FIGS. 2-13. The description of system 1500 provided herein is provided for purposes of illustration, and is not intended to be limiting. Embodiments may be implemented in further types of computer systems, as would be known to persons skilled in the relevant art(s).

As shown in FIG. 15, system 1500 includes a processing unit 1502, a system memory 1504, and a bus 1506 that couples various system components including system memory 1504 to processing unit 1502. Processing unit 1502 may comprise one or more microprocessors or microprocessor cores. Bus 1506 represents one or more of any of several types of bus structures, including a memory bus or memory controller, a peripheral bus, an accelerated graphics port, and a processor or local bus using any of a variety of bus architectures. System memory 1504 includes read only memory (ROM) 1508 and random access memory (RAM) 1510. A basic input/output system 1512 (BIOS) is stored in ROM 1508.

System 1500 also has one or more of the following drives: a hard disk drive 1514 for reading from and writing to a hard disk, a magnetic disk drive 1516 for reading from or writing to a removable magnetic disk 1518, and an optical disk drive 1520 for reading from or writing to a removable optical disk 1522 such as a CD ROM, DVD ROM, BLU-RAY™ disk or other optical media. Hard disk drive 1514, magnetic disk drive 1516, and optical disk drive 1520 are connected to bus 1506 by a hard disk drive interface 1524, a magnetic disk drive interface 1526, and an optical drive interface 1528, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1530, one or more application programs 1532, other program modules 1534, and program data 1536. In accordance with various embodiments, the program modules may include computer program logic that is executable by processing unit 1502 to perform any or all of the functions and features of computing device 100 as described above in reference to FIG. 1. The program modules may also include computer program logic that, when executed by processing unit 1502, performs any of the steps or operations shown or described in reference to the flowcharts of FIGS. 2-13.

A user may enter commands and information into system 1500 through input devices such as a keyboard 1538 and a pointing device 1540. Other input devices (not shown) may include a microphone, joystick, game controller, scanner, or the like. In one embodiment, a touch screen is provided in conjunction with a display 1544 to allow a user to provide user input via the application of a touch (as by a finger or stylus for example) to one or more points on the touch screen. These and other input devices are often connected to processing unit 1502 through a serial port interface 1542 that is coupled to bus 1506, but may be connected by other interfaces, such as a parallel port, game port, or a universal serial bus (USB). Such interfaces may be wired or wireless interfaces.

A display 1544 is also connected to bus 1506 via an interface, such as a video adapter 1546. In addition to display 1544, system 1500 may include other peripheral output devices (not shown) such as speakers and printers.

System 1500 is connected to a network 1548 (e.g., a local area network or wide area network such as the Internet) through a network interface or adapter 1550, a modem 1552, or other suitable means for establishing communications over the network. Modem 1552, which may be internal or external, is connected to bus 1506 via serial port interface 1542.

As used herein, the terms "computer program medium," "computer-readable medium," and "computer-readable storage medium" are used to generally refer to memory devices or storage structures such as the hard disk associated with hard disk drive 1514, removable magnetic disk 1518, removable optical disk 1522, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1532 and other program modules 1534) may be stored on the hard disk, magnetic disk, optical disk, ROM, or RAM. Such computer programs may also be received via network interface 1550, serial port interface 1542, or any other interface type. Such computer programs, when executed or loaded by an application, enable computer 1500 to implement features of embodiments of the present invention discussed herein. Accordingly, such computer programs represent controllers of the system 1500.

Embodiments are also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, system 1500 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

VI. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method implemented by a computing device for managing a resource thereof, comprising:
    determining a first amount of the resource that is used by a first instance of an application while being executed by the computing device, the determining including determining an amount of the resource that is used by a foreground process associated with the first instance of the application and one or more background tasks associated with the first instance of the application;
    calculating a first predicted resource usage amount for the application based at least on the first amount by obtaining an average resource usage amount for the application based on the first amount and one or more previously-determined amounts respectively associated with one or more previously-executed instances of the application;
    storing the first predicted resource usage amount in a data store;
    determining a second amount of the resource to be allocated to a second instance of the application to be executed by the computing device based at least on the first predicted resource usage amount stored in the data store; and
    performing one of:
        in response to determining that an amount of the resource used by the second instance of the application while being executed by the computing device exceeds the second amount, terminating one or more processes that are concurrently executing on the computing device,
        in response to determining that the second amount of the resource is not currently available, preventing execution of the second instance of the application, or
        in response to determining that the second amount of the resource is not currently available, terminating one or more processes that are currently executing on the computing device.

2. The method of claim 1, wherein the resource comprises at least one of:
    a volatile or non-volatile memory resource;
    a central processing unit (CPU) resource;
    an input/output (I/O) resource;
    a network resource;
    a power resource; and
    a sensor resource.

3. The method of claim 1, wherein calculating the first predicted resource usage amount for the application based on at least the first amount further comprises:
    obtaining a maximum resource usage amount for the application by comparing the first amount to one or more previously-determined amounts associated with one or more previously-executed instances of the application; and
    calculating the first predicted resource usage amount based also on the maximum resource usage amount.

4. The method of claim 1, wherein the determining, calculating and storing steps comprise:
    determining the first amount of the resource that is used by the first instance of the application while being executed by the computing device on behalf of a first user;
    calculating the first predicted resource usage amount for the application and the first user based at least on the first amount;
    storing the first predicted resource usage amount in the data store; and
    determining the second amount of the resource to be allocated to the second instance of the application to be executed by the computing device on behalf of the first user based at least on the first predicted resource usage amount stored in the data store;
    the method further comprising:
        determining a third amount of the resource that is used by a third instance of the application while being executed by the computing device on behalf of a second user;
        calculating a second predicted resource usage amount for the application and the second user based at least on the third amount;
        storing the second predicted resource usage amount in the data store; and
        determining a fourth amount of the resource to be allocated to a fourth instance of the application to be executed by the computing device on behalf of the second user based at least on the second predicted resource usage amount stored in the data store.

5. The method of claim 1, wherein the foreground process associated with the first instance of the application provides a user interface for the first instance of the application.

6. The method of claim 1, wherein at least one of the one or more background tasks associated with the first instance of the application is executed concurrently with the foreground process.

7. The method of claim 1, wherein at least one of the one or more background tasks associated with the first instance of the application is initiated by the foreground process.

8. The method of claim 1, wherein obtaining the average resource usage amount for the application based on the first amount and the one or more previously-determined amounts respectively associated with the one or more previously-executed instances of the application comprises:
- multiplying the first amount by a first weighting factor to obtain a first product;
- multiplying a running average amount obtained based on at least the one or more previously-determined amounts by a second weighting factor to obtain a second product; and
- summing the first product and the second product.

9. The method of claim 8, wherein the first weighting factor is larger than the second weighting factor.

10. A computer program product comprising a computer-readable memory device having computer program logic recorded thereon that when executed by at least one processor of a computing device causes the at least one processor to perform operations, the operations comprising:
- receiving a request to launch an application;
- obtaining a predicted resource usage amount for the application, the predicted resource usage amount being based on a monitored usage of a resource of the computing device by a foreground process associated with the application and one or more background tasks associated with the application during multiple prior executions of the application, the predicted resource usage amount being obtained by calculating an average resource usage amount for the application based on the monitored usage of the resource during the multiple prior executions of the application;
- determining whether a sufficient amount of a resource is available by comparing the predicted resource usage amount to an amount of the resource that is currently available; and
- allowing the application to launch in response to at least determining that a sufficient amount of the resource is available.

11. The computer program product of claim 10, wherein the resource comprises one of:
- a volatile or non-volatile memory resource;
- a central processing unit (CPU) resource;
- an input/output (I/O) resource;
- a network resource;
- a power resource; and
- a sensor resource.

12. The computer program product of claim 10, wherein the operations further comprise:
- not allowing the application to launch in response to at least determining that a sufficient amount of the resource is not available.

13. The computer program product of claim 10, wherein the operations further comprise:
- causing one or more processes to be terminated in response to at least determining that a sufficient amount of the resource is not available.

14. The computer program product of claim 10, wherein the operations further comprise:
- in response to determining that an amount of the resource used by the application after being launched exceeds the predicted resource usage amount, terminating one or more processes that are concurrently executing on the computing device.

15. The computer program product of claim 10, wherein the receiving step comprises receiving the request to launch the application on behalf of a first user and wherein the obtaining step comprises obtaining a predicted resource usage amount for the application and the first user.

16. A system implemented on a computing device, comprising:
- at least one processor; and
- memory that is accessible by the at least one processor, the memory storing components for execution by the at least one processor, the components including:
- a resource manager that monitors a pattern of usage of a resource of the computing device by an application, stores information associated with the pattern of usage, and uses the stored information to predictively allocate at least a portion of the resource to at least one process prior to execution thereof by the at least one processor, the monitoring a pattern of usage of the resource of the computing device including monitoring an amount of the resource that is used by a foreground process associated with the application and one or more background tasks associated with the application, and the predictive allocation comprising obtaining a predicted resource usage amount by calculating an average resource usage amount for the application based on a monitored usage of the resource during multiple prior executions of the application.

17. The system of claim 16, wherein the at least one resource comprises:
- a volatile or non-volatile memory resource;
- a central processing unit (CPU) resource;
- an input/output (I/O) resource;
- a network resource;
- a power resource; and
- a sensor resource.

18. The system of claim 16, wherein the resource manager predictively allocates the at least a portion of the resource to an application prior to launching of the application by any entity.

19. The system of claim 16, wherein the at least one resource comprises memory and wherein the resource manager loads at least a portion of an application or data associated with an application into the predictively-allocated memory prior to launching of the application by an entity.

* * * * *